US011406997B2

(12) United States Patent
Fontana et al.

(10) Patent No.: US 11,406,997 B2
(45) Date of Patent: Aug. 9, 2022

(54) APPARATUS FOR GENERATING AND OPTICALLY CHARACTERIZING AN AEROSOL

(71) Applicant: The Government of the United States of America, as represented by the Secretary of the Navy, Arlington, VA (US)

(72) Inventors: Jake Fontana, Alexandria, VA (US); Jawad Naciri, Arlington, VA (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 313 days.

(21) Appl. No.: 16/784,534

(22) Filed: Feb. 7, 2020

(65) Prior Publication Data

US 2020/0261939 A1    Aug. 20, 2020

Related U.S. Application Data

(60) Provisional application No. 62/918,713, filed on Feb. 16, 2019.

(51) Int. Cl.
   *B05B 12/00*     (2018.01)
   *G01N 21/3504*   (2014.01)
   *B05B 9/04*      (2006.01)
   *G01N 21/03*     (2006.01)
   (Continued)

(52) U.S. Cl.
   CPC .......... *B05B 12/004* (2013.01); *B05B 9/0403* (2013.01); *G01N 21/031* (2013.01); *G01N 21/3504* (2013.01); *G01N 2001/1025* (2013.01); *G01N 2021/3595* (2013.01)

(58) Field of Classification Search
   CPC ... B05B 12/004; B05B 9/0403; B05B 7/0012; B05B 7/2424; G01N 21/031; G01N 21/3504; G01N 2001/1025; G01N 2021/3595; G01N 1/14; G01N 2001/1436; G01N 1/4055; G01N 2001/4061; G01N 21/31
   See application file for complete search history.

(56) References Cited

U.S. PATENT DOCUMENTS

2016/0214075 A1*    7/2016    Suslick .................... B01J 13/14

OTHER PUBLICATIONS

Geldmeier et al., "Plasmonic aerosols" Phys. Rev. B 99, 081112(R) (Feb. 13, 2019).

* cited by examiner

*Primary Examiner* — David P Porta
*Assistant Examiner* — Meenakshi S Sahu
(74) *Attorney, Agent, or Firm* — US Naval Research Laboratory; Joseph T. Grunkemeyer

(57) ABSTRACT

An apparatus having: a vessel for containing a suspension of a liquid and solid particles; a tube having a narrowed portion to draw the suspension from the vessel into the tube when a gas flows through the tube; an aerosol generator coupled to the tube for forming an aerosol from the suspension; a dehydrator coupled to the aerosol generator for removing the liquid from the aerosol forming a dried aerosol; a multiple-pass spectroscopic absorption cell coupled to the dehydrator to pass the dried aerosol into the absorption cell; and a Fourier transform spectrometer coupled to the absorption cell to measure an absorption spectrum of the dried aerosol.

9 Claims, 14 Drawing Sheets

(51) Int. Cl.
*G01N 21/35* (2014.01)
*G01N 1/10* (2006.01)

APPARATUS FOR GENERATING AND OPTICALLY CHARACTERIZING AN AEROSOL

This application claims the benefit of U.S. Provisional Application No. 62/918,713, filed on Feb. 16, 2019.

TECHNICAL FIELD

The present disclosure is generally related to aerosol generation.

DESCRIPTION OF RELATED ART

The relationship between aerosol particles and cloud systems is a poorly understood nonlinear process and is the largest uncertainty to accurately predicting climate and extreme weather events.[1,2] Aerosol particles serve as nucleation sites for water molecules to condense into droplets that can then form into clouds. Recent work posited that aerosol particles from the exhaust of ships enhanced the intensity and electrification of storms, showing that the density of lightning strikes doubled over shipping lanes.[3] Moreover, ultrafine aerosol particles (diameter <50 nm), once thought to be too small to influence cloud formation, have recently been shown to significantly intensify the convective strength of cloud systems,[2] indicating that nanoparticle aerosols may also be used for geoengineering applications.[4-10]

The influence of nanoparticle aerosols on cloud formation is extremely complex and hard to disentangle, and a significant need exists to experimentally model these systems in controlled environments to carefully examine the nanoscale mechanisms governing these macroscale processes. Aerosols composed of micrometer-sized particles have been thoroughly investigated for decades.[11] However, the experimental aerosolization and optical detection of nanoparticle aerosols is a longstanding challenge due to factors such as aggregation upon the liquid-gas phase transition, relatively dilute concentrations, or small light-matter coupling.[12]

Plasmonic nanoparticles are promising candidates for benchtop aerosol studies. They couple strongly to light, leading to the capability to optically detect them in dilute concentrations, and they are also sensitive to changes in their surrounding environment. A simple harmonic oscillator model can be used to describe the behavior of the plasmonic nanoparticles in an optical field.[11] From this model, the imaginary electric susceptibility of a plasmonic nanoparticle is $\chi''=\beta\omega_p^2\omega/[(L\omega_p^2-\omega^2)^2+\beta^2\omega^2]$, where $\beta$ is the damping constant, $L$ is the depolarization factor, $\omega_p$ is the plasma frequency, and $\omega$ is the frequency of the incident light. The imaginary susceptibility, and consequently the absorption, is a maximum at resonance, $\omega=\sqrt{L}\omega_p$, yielding $\chi''_{max}=\omega_p/(\beta\sqrt{L})$. Therefore, a pragmatic nanoparticle to maximize the absorption is a gold nanorod[13-15] due to its large $\omega_p$, small $L$ (along the long axis of the nanorod), and mature chemical-based fabrication.

The nanorods will be thermodynamically stable in the gas state when the gravitational force $\Delta\rho V g$ is less than the stabilizing thermal forces $k_B T/l$, where $\Delta\rho$ is the density difference between the nanorod and gas, $V=\frac{3}{4}\pi r^2 l$ is the volume of the nanorod, $l$ is the length and $r$ is the radius of the nanorod, $k_B$ is the Boltzmann constant, and $T$ is the absolute temperature. Accordingly, if the length of the gold nanorods is smaller than $3k_B T/4\pi\Delta\rho g r^2 \approx \mu m$, then they will remain suspended in the gas state. Gold is also an inert metal, making it biocompatible and environmentally friendly. Additionally, recent gram-scale, colloidal gold nanorod synthesis breakthroughs have now made these materials accessible in large quantities.[16]

BRIEF SUMMARY

Disclosed herein is an apparatus comprising: a vessel for containing a suspension comprising a liquid and solid particles suspended therein; a tube having a narrowed portion configured to draw the suspension from the vessel into the tube when a gas flows through the tube; an aerosol generator coupled to the tube for forming an aerosol from the suspension; a dehydrator coupled to the aerosol generator for removing the liquid from the aerosol forming a dried aerosol; a multiple-pass spectroscopic absorption cell coupled to the dehydrator to pass the dried aerosol into the absorption cell; and a Fourier transform spectrometer coupled to the absorption cell to measure an absorption spectrum of the dried aerosol.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a solution to a decades-old problem of simultaneously aerosolizing and measuring the optical response of plasmonic nanoparticles in the gas phase, thereby uniting the fields of plasmonics and aerosols. It is shown that the aerosols are optically homogeneous, thermodynamically stable, with wide wavelength tunability, and extremely high sensitivities to their environment that may be useful in aiding geoengineering challenges. It is anticipated that plasmonic aerosols will open up broad and innovative approaches to understand the underlying physics of inaccessible climatology, astronomy, petroleum, and medical environments. In the context of vacuum microelectronics,[17-19] if plasmonic aerosols are encapsulated into micron-sized elements and gated using external electric fields, then the electro-optic properties of the element may be reconfigurable by controlling the orientational order of the nanorods.[20,21] These materials may also be useful for nonlinear optics[6-8], nanojet printing[22], molecular diagnostics[23], or nanomedicines[24].

Figure 1:
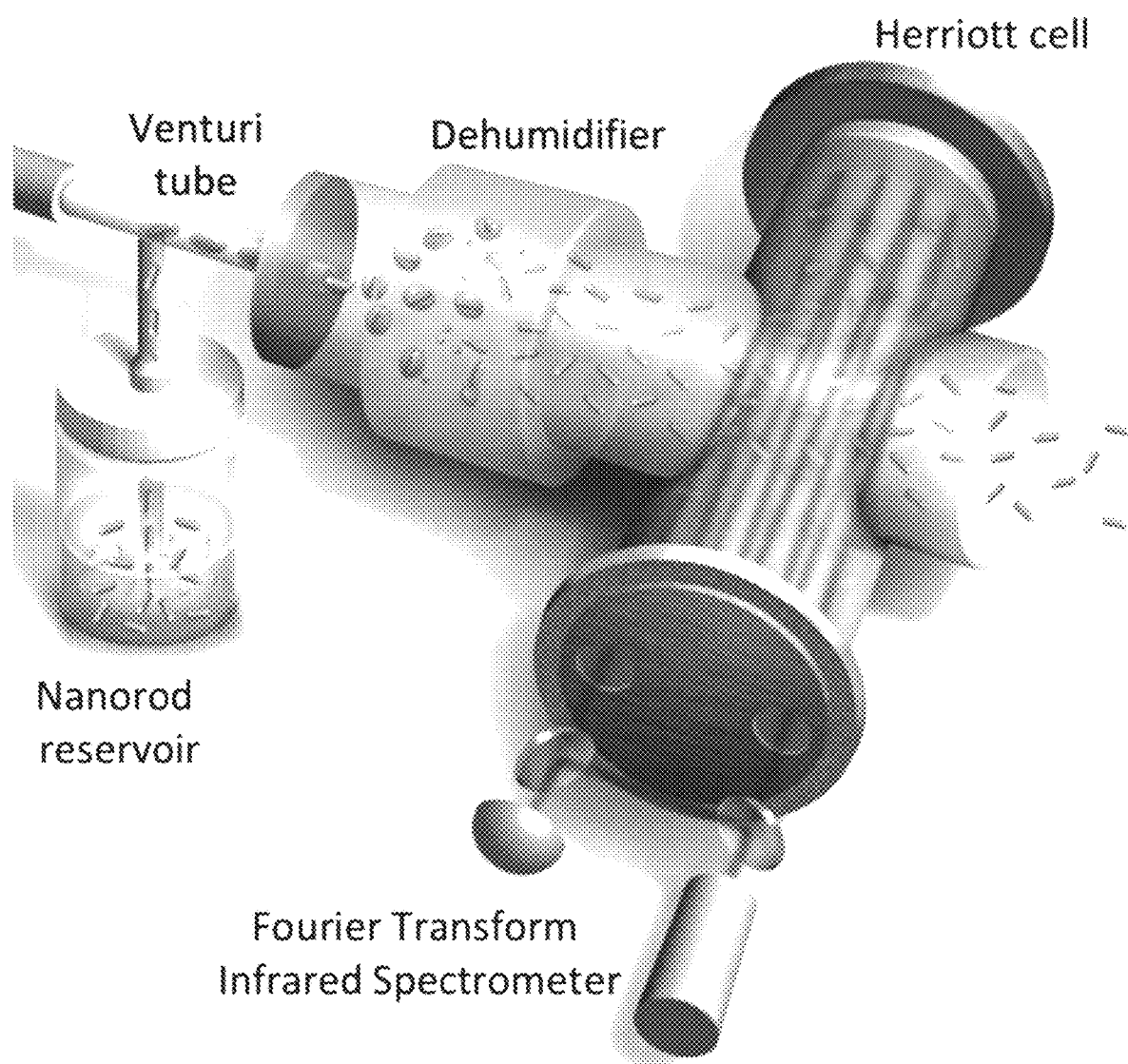
FIG. 1 schematially illustrates the experimental apparatus to aerosolize and optically measure gold nanorods in the gas phase in situ.

The disclosed apparatus is illustrated in FIG. 1. It may be used with a suspension of solid particles in a liquid. One example type of particles is nanorods. The liquid can be any liquid capable of suspending the particles. Aqueous suspensions are typical. As shown in FIG. 1, the suspension is placed in a vessel with a tube having a narrowed portion, such as a Venturi tube. When a gas, such as dry air, flows through the tube, it draws the suspension into the tube. The narrowed portion increases the amount of suspension drawn into the tube.

The suspension then flows into an aerosol generator which forms an aerosol from the suspension. This aerosol contains liquid droplets with suspended particles. The droplets may be, for example, up to 1 micron in diameter. The aerosol then flows through a dehydrated that removes all or most of the liquid to make a dried aerosol. The dehydrator may include a desiccant the dries the aerosol by diffusion. The dried aerosol may contain only the particles suspended in the gas, or there may be trace amounts of liquid remaining.

The dried aerosol then flows into a multiple-path spectroscopic absorption cell, such as a Herriott cell. The optical path length of the cell may be, for example, up to 20 meters long. A Fourier transform spectrometer is then used to measure an absorption spectrum of the dried aerosol. The spectrum may include the IR, visible, and/or UV range, including near and/or far IR.

A vacuum pump at the spectrometer end may be used to draw the gas or air through the entire apparatus.

The following examples are given to illustrate specific applications. These specific examples are not intended to limit the scope of the disclosure in this application.

Materials—Hexadecyltrimethylammonium bromide (CTAB, >98%) and silver nitrate (>99.99%) were purchased from GFS Chemicals. Octadecyltrimethylammonium bromide (OTAB, >98%), benzyldimethylhexadecylammonium chloride (BDAC, >95%), and L-ascorbic acid (>99.0%) were purchased from TCI. Gold (III) chloride trihydrate (99.9%), sodium borohydrate (99.99%), hydroquinone (>99%), and trisodium citrate dihydrate were purchased from Sigma-Aldrich. Thiol-terminated polystyrene ($M_n$=5000 Da) was purchased from Polymer Source, Inc.

Nanorod synthesis—Multiple nanorod synthesis techniques were used based on the desired aspect ratio. High aspect ratio nanorods (30-40) were synthesized according to the procedure described by Kitahata et al.[25] A CTAB concentration of 100 mM was used for all high aspect ratio synthesis methods while the OTAB concentration was varied between 30-75 mM to change the nanorod aspect ratio. The temperature was fixed at 20° C. for both the seed and growth solutions. Nanorods with an aspect ratio of approximately 17 were prepared using the seed-mediated procedure described by Zubarev et al.[27] Nanorods with an aspect ratio of 5 were synthesized with a CTAB/BDAC surfactant growth solution as described by Park et al.[16] The resulting gold nanorod suspensions were centrifuged at either 5,000 rpm (AR 30-40) or 10,000 rpm (AR 5-17) for 15 min. and resuspended in DI water to their initial volumes before another centrifugation step and 10-fold concentration. For redispersion in toluene, nanorods were phase transferred using thiol-terminated polystyrene according to a previously established procedure.[20]

Aerosolization—The experimental setup is schematically illustrated in FIG. 1. Aqueous gold nanorod suspensions were aerosolized with an atomizer (TSI, Model 3076) in a non-recirculatory mode that generated aerosol droplets with an average diameter of 0.3 μm. The flow rate lof the liquid suspension was 50 mL/h. The wet aerosol was then passed through a dehumidifier (TOPAS, DDU 570H) to remove the water content. A Herriott gas cell (Pike Technologies) with a 1-16 m optical path length coupled to a Fourier transform infrared spectrometer (Bruker, Vertex 70) was used for optical measurements, from 0.6-3 μm or 1-10 μm with milli-optical density (mOD) resolution. The exhaust port from the Herriott cell was connected to a vacuum line at an air flow rate of approximately 3.0 L/min. All instruments were connected with static-dissipative silicone rubber tubing (McMaster-Carr). During each sample measurement, aerosols were flowed for 3 min before spectra collection to ensure aerosol saturation in the gas cell. A pure water aerosol was first collected and subtracted from the nanorod-water aerosols. Dry air was flowed for 5 min between aerosol samples. A silicon detector, quartz beamsplitter, and a halogen lamp source were used for optical measurements in the visible and NIR regions while a mercury cadmium telluride (MCT) detector, KBr beamsplitter, and a globar source were used for measurements in the MIR region.

Figure 2:
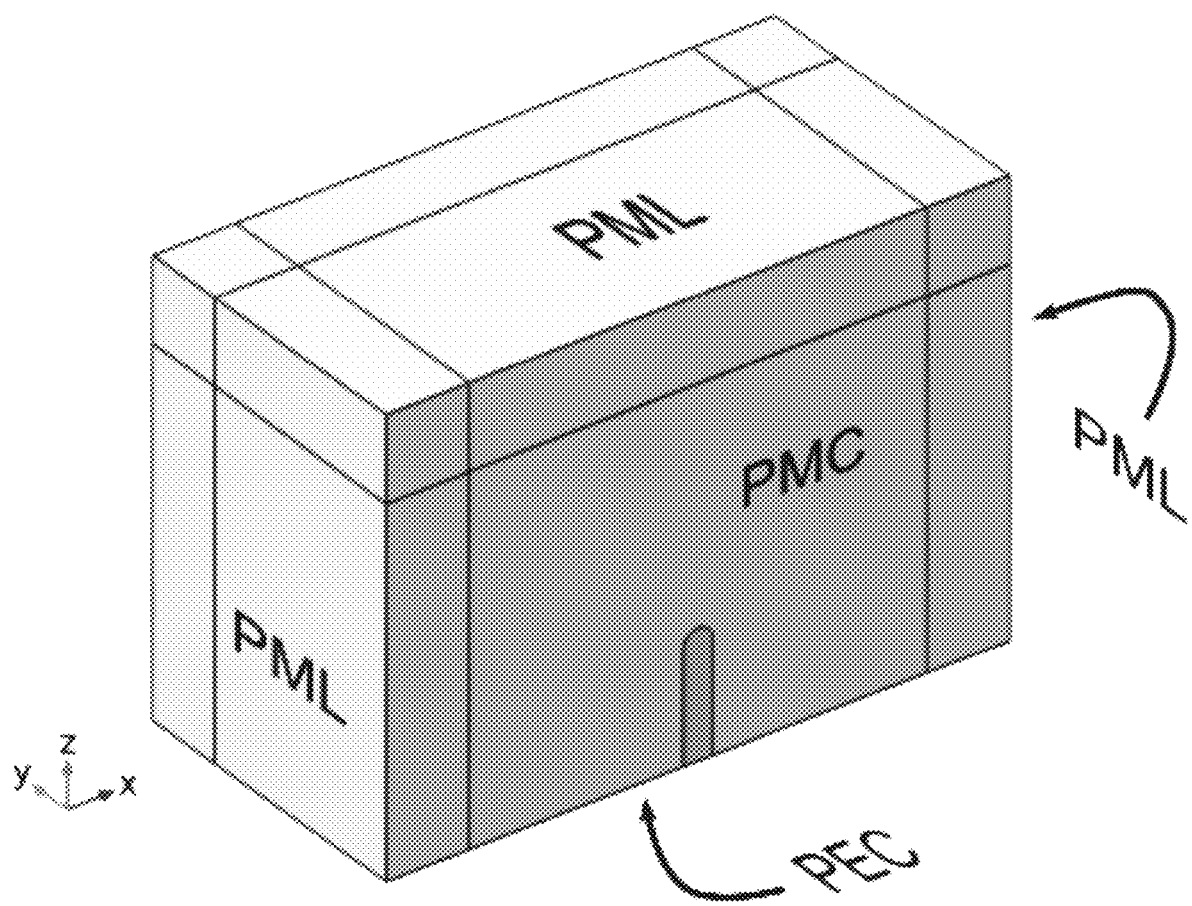
FIG. 2 shows the geometry of the COMSOL model used in calculating extinction cross sections. A gold nanorod is built in a box, with one face as a Perfect Magnetic Conductor (PMC) and another face as a Perfect Electric Conductor (PEC) to account for symmetry. All other edges are surrounded by Perfectly Matched Layers (PML) to absorb reflections.
Figure 3:
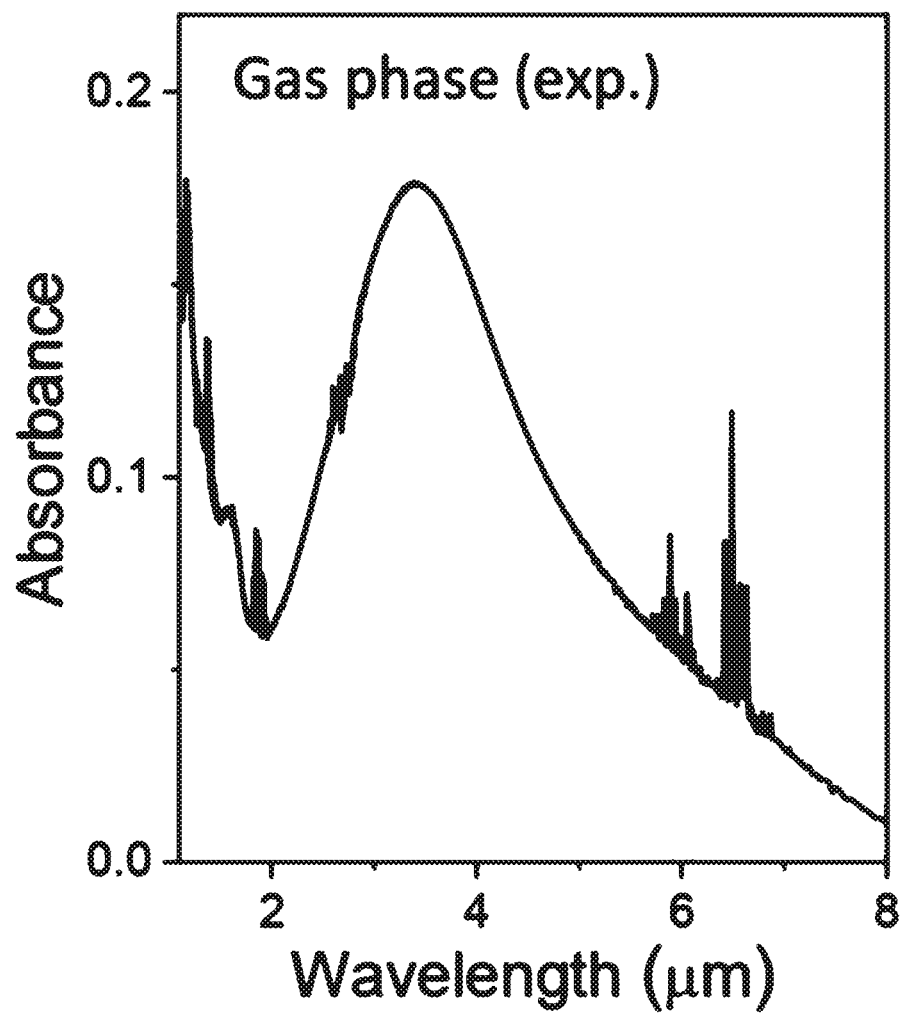
FIG. 3 shows the absorbance spectra of high aspect ratio gold nanorods in the gas phase.
Figure 4:
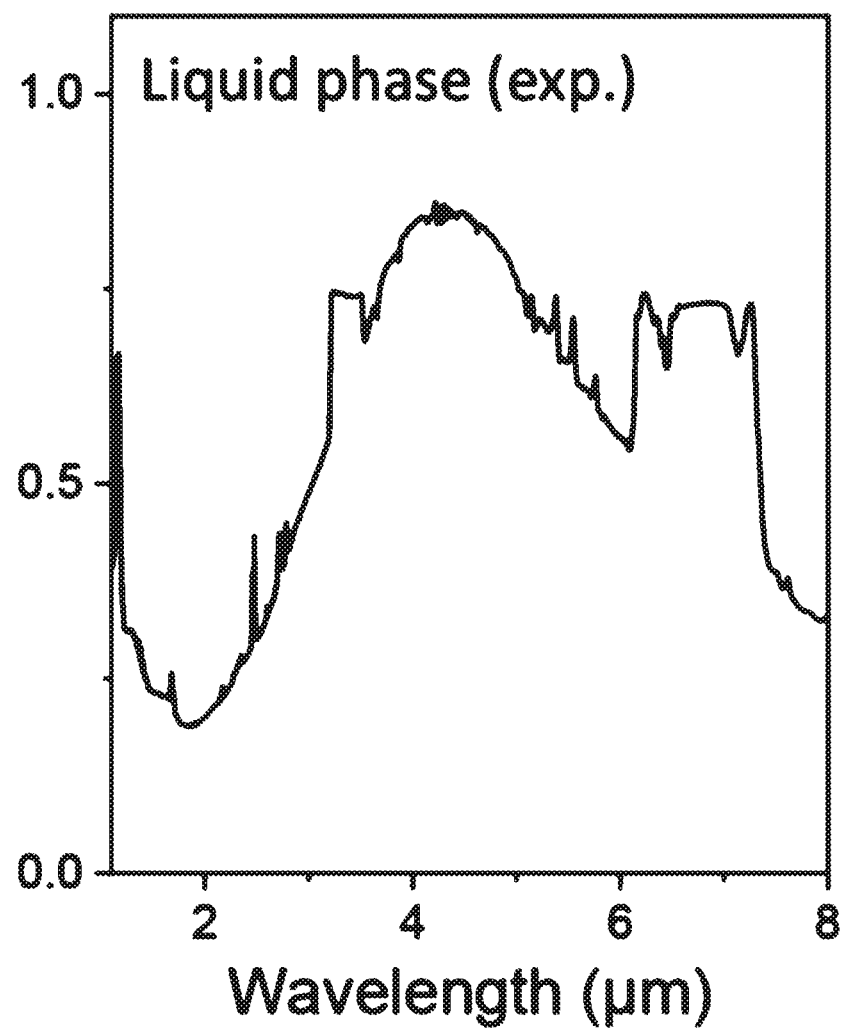
FIG. 4 shows the absorbance spectra of high aspect ratio gold nanorods in the liquid phase.
Figure 5:
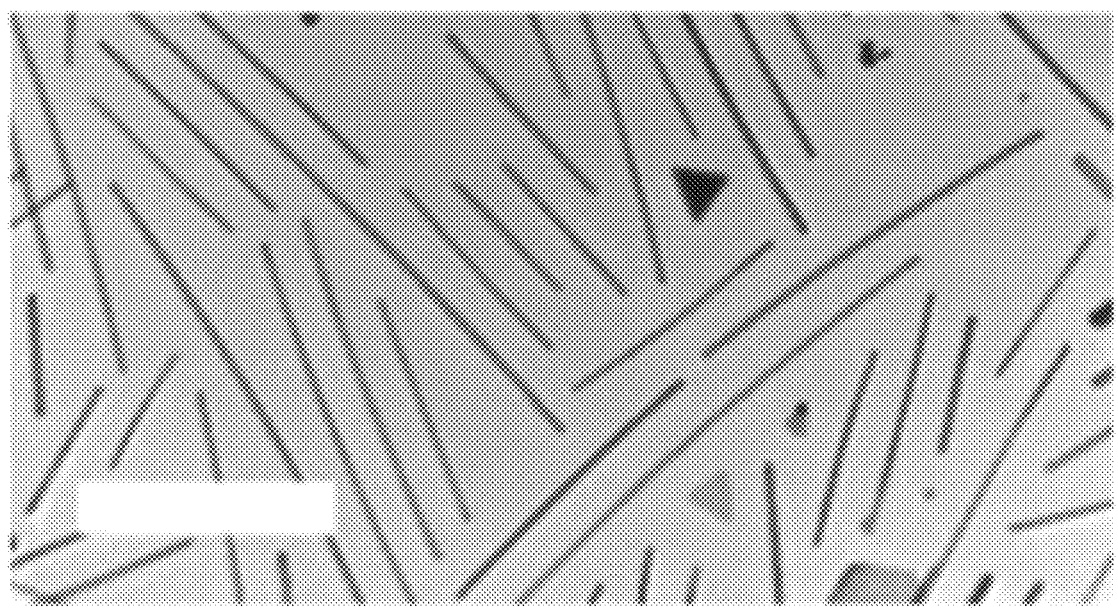
FIG. 5 shows a representative TEM image. The scale bar is 500 nm.
Figure 6:
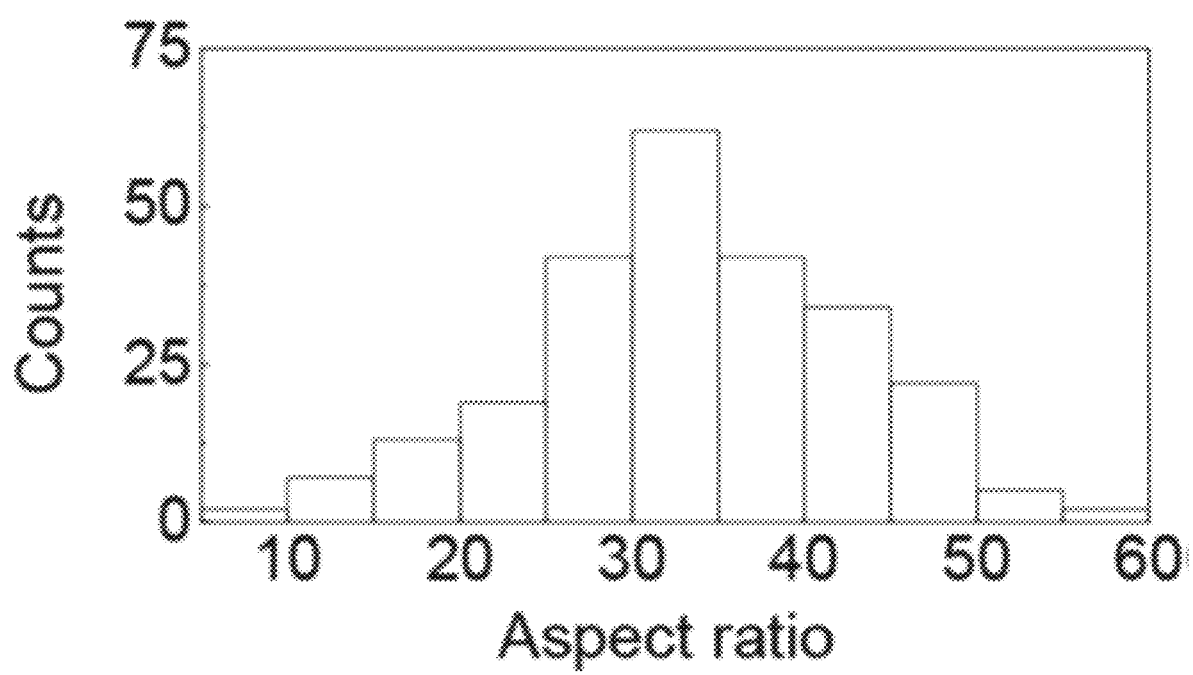
FIG. 6 shows aspect ratio statistics corresponding corresponding to FIG. 5.

COMSOL simulations—A gold nanorod was constructed in a box with the length of the rod in the z-direction and the center of the nanorod located at x=y=z=0. The refractive index of the surrounding materials was considered to be constant for the wavelengths studied (air, water, or toluene, n=1, 1.33, or 1.475, respectively). The refractive index of gold was taken from Rakić.[32] The computational requirements were reduced by symmetry, computing the electric field of only ¼ of the structure. The nanorod and simulation box were cut in half in the xy-plane at z=0 and in the xz-plane at y=0. The xy-plane was specified as a Perfect Electric Conductor (PEC) and the xz-plane was specified as a Perfect Magnetic Conductor (PEC). All other edges were surrounded by Perfectly Matched Layers (PML) to absorb reflections. An illustration of the model can be seen in FIG. 2.

A background electric field propagating in the x-direction and polarized in the z-direction was specified in the calculation to excite the plasmon mode, $E_{b,z}=E_0\exp(-ik_0 n_{med} x)$, where $E_{b,z}$ is the z-component of the background electric field, $E_0=1$ V/m, $k_0$ is the free space wavevector, and $n_{med}$ is the refractive index of the medium. Absorption cross sections ($\sigma_{abs}$) were calculated by integrating the power dissipation, Q, over the volume of the nanorod, $$\sigma_{abs} = \frac{\iiint Q}{P_{in}},$$

where $P_{in}$ is the input power, which is calculated as, $$P_{in} = \frac{E_0^2}{2Z_0 n},$$

where $Z_0$ is the characteristic impedance of vacuum. Scattering cross sections ($\sigma_{scat}$) were calculated by integrating the Poynting vector, S, over a surface surrounding the simulation domain (the boundary between the surrounding medium and the PML), $$\sigma_{scat} = \frac{\iint S}{P_{in}}.$$

Both $\sigma_{abs}$ and $\sigma_{scat}$ were multiplied by a factor of four to adjust for calculating the electric field of only ¼ of the structure.

Figure 10:
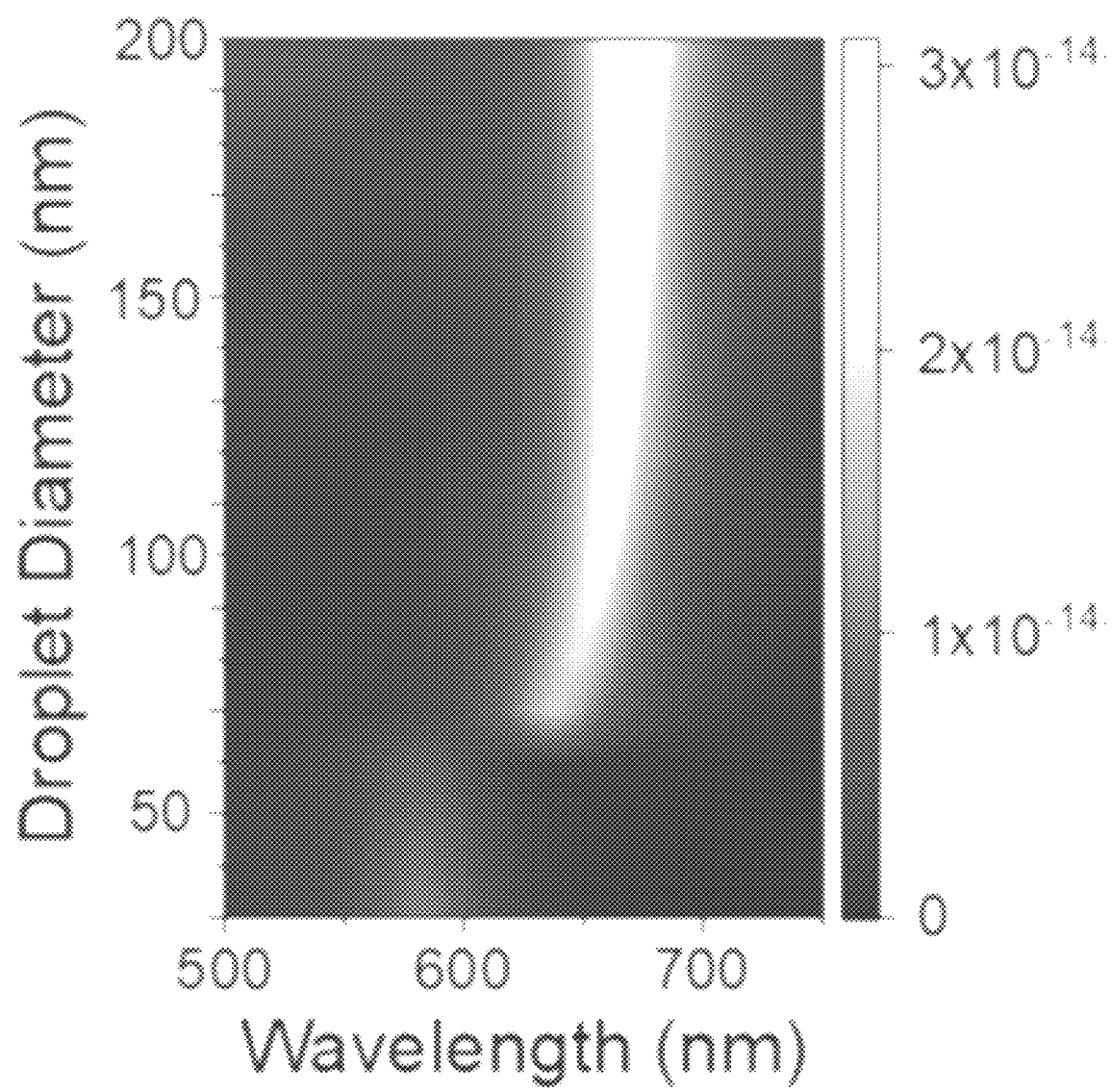
FIG. 10 shows a color map of a nanorod surrounded by water and air, as the diameter of a water droplet D encasing the nanorod decreases.

Results and discussion—FIG. 1 shows a schematic for the transition of aqueous suspensions of gold nanorods from the liquid phase into the gas phase while simultaneously measuring their optical responses. The gold nanorods were synthesized using wet-seed mediated synthesis approaches that enabled tuning of the aspect ratio (length l to diameter d) from 1.5 to 38.[16,25,26] Transmission electron microscopy (TEM) was used to measure the polydispersity of the nanorods, yielding less than 10% for aspect ratios smaller than 20 and 25% for larger aspect ratios. To aerosolize the nanorods, a Venturi tube was used to drive high-velocity air over a reservoir of gold nanorods in a liquid suspension, pulling the suspension into the airstream. Upon exiting the tube, the liquid suspension breaks apart into an aerosol containing liquid droplets (diameter ~300 nm) with embedded nanorods. The droplets then enter a dehumidifier chamber that evaporates the remaining water from the nanorods, thereby creating a suspension of dry nanorods in the gas phase. To measure the in situ absorbance spectra of the gold nanorods in the gas phase, a 10-m optical path length Herriott cell was placed at the exit of the dehumidifier. The Herriott cell was integrated into a Fourier transform infrared (FTIR) spectrometer, enabling the optical signatures of the plasmonic aerosols to be measured from 0.6 to 3 μm or 1 to 10 μm in a continuous manner.

The absorbance spectra of the gold nanorods in the gas phase are shown in FIG. 3, revealing a well-defined absorption peak at 3.3 μm. The relatively large effective *Q* factor ($\lambda_0$/FWHM) of 1.3 in FIG. 3 suggests that the nanorods are not flocculated or aggregated upon transitioning from the liquid to the gas phase. The magnitude of the absorbance peak was constant while the measurements were performed (average of 16 individual spectra) demonstrating the aerosols are temporally stable. The constant absorbance peak also implies the aerosols are optically homogeneous, which is expected since the nanorods are generally much smaller than the wavelength of the light (~$\lambda_0$/10). The sharp absorbance peaks around 6 μm are due to the O—H molecular vibration from trace amounts of water vapor. The apparent increase in absorbance near 1 μm may be attributed to these wavelengths being near the wavelength detection limit for the specific FTIR detector-beam-splitter combination, although triangular platelet by-products from the high aspect nanorod synthesis may have resonances in this region as well. The density of nanorods in the Herriott cell is estimated to be $\rho=A/\sigma x\approx10^{11}$ NR/m$^3$, where A=0.18 is the peak absorbance at 3.3 μm, $\sigma=9.4\times10^{-14}$ m$^2$/NR is the extinction cross section of the nanorod, which was retrieved from three-dimensional finite-element simulations (COMSOL MULTIPHYSICS, version 5.3a), and x=10 m is the path length of light through the Herriott cell.

Due to water's prohibitively large absorption bands beyond 1.2 μm, the nanorods were phase transferred from water into toluene suspensions[20] to enable the absorbance spectra in the infrared region to be measured in the liquid phase, as seen in FIG. 4. While molecular vibrations from the aromatic ring of toluene are still significant throughout the spectrum, leading to detector saturation in some wavelength bands, the absorbance peak from the nanorods is apparent. TEM images, as shown in FIG. 5, were used to determine an average aspect ratio of 32.3 (l=646±156 nm, d=20±4 nm) as shown in FIG. 6.

The aspect ratio of the gold nanorods was varied from 1.5, 2.5, 3, and 4.5 in water to 10, 15, and 30 in toluene in FIG. 7, demonstrating nearly a decade in experimental wavelength tunability from 0.6 to 5 μm in the liquid phase. The effective *Q* factor in the liquid phase varied from 5 to 1 for aspect ratios ranging from 1.5 to 30, respectively.

The optical response of gold nanorods in the gas phase with aspect ratios of 5, 15, and 30 are shown in FIG. 8, spanning over 2.5 μm in wavelength tunability. The effective *Q* factor in the gas phase varied from 2.4 to 1.3 for aspect ratios of 5 to 30, respectively.

Three-dimensional finite-element simulations in FIGS. 7 and 8 were used to replicate the experimental isotropic spectra of the nanorods in the liquid and gas states. The simulated longitudinal absorbance peak wavelengths are in good agreement with the experimental values as a function of aspect ratio and solvent index. The effective *Q* factors of the longitudinal absorbance peaks from the simulated spectra are larger than for the experimental spectra due to experimental variations in the aspect ratio of the nanorods[27]. The small blueshifted absorbance peaks, relative to the longitudinal peaks, are due to the transverse axis of the nanorods.

To understand the spectroscopic evolution of the evaporating water-nanorod droplets, further simulations were carried out in FIGS. 9-13. Initially, a nanorod (l=60 nm, d=25 nm) was surrounded with water, yielding an extinction peak wavelength at 670 nm (FIG. 9). The nanorod was then embedded into a water droplet of diameter D=200 nm and surrounded by air. The magnitude of the peak is increased by ~⅓ compared to a homogenous water medium due to the increased scattering contribution to the extinction from the water droplet surface. As the diameter of the water droplet decreased to 61 nm, mimicking evaporation, the peak wavelength blueshifted to 624 nm. The extinction peak then drastically shifted to 582 nm when D=l=60 nm, as seen in FIG. 10, due to the ends of the nanorod being exposed to air. For droplet diameters less than the length of the nanorod the extinction peak remains constant, only slightly increasing in magnitude once all the water is removed.

Figure 11:
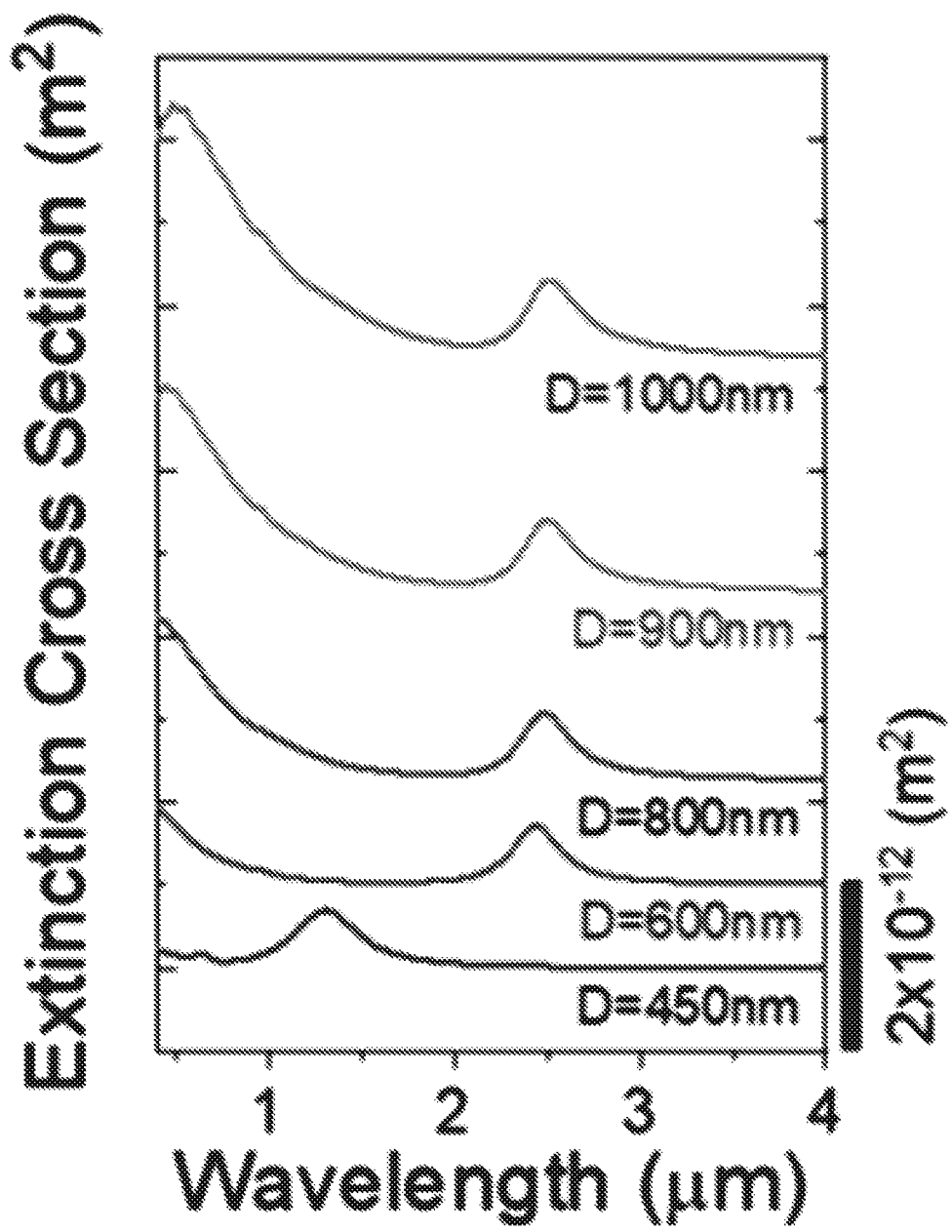
FIG. 11 shows the extinction of a gold nanorod as the diameter of the water droplet decreases.
Figure 12:
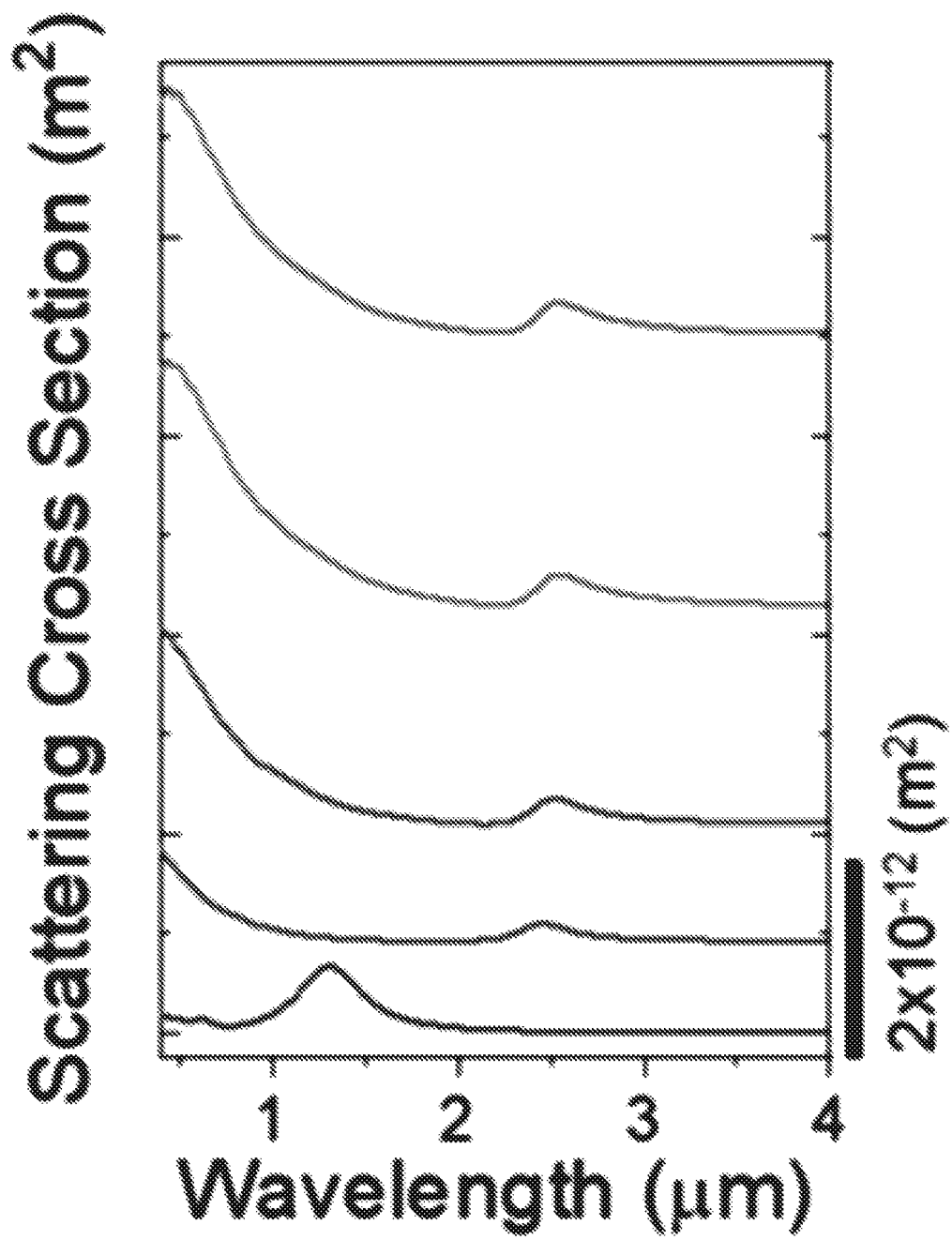
FIG. 12 shows the scattering of a gold nanorod as the diameter of the water droplet decreases.
Figure 13:
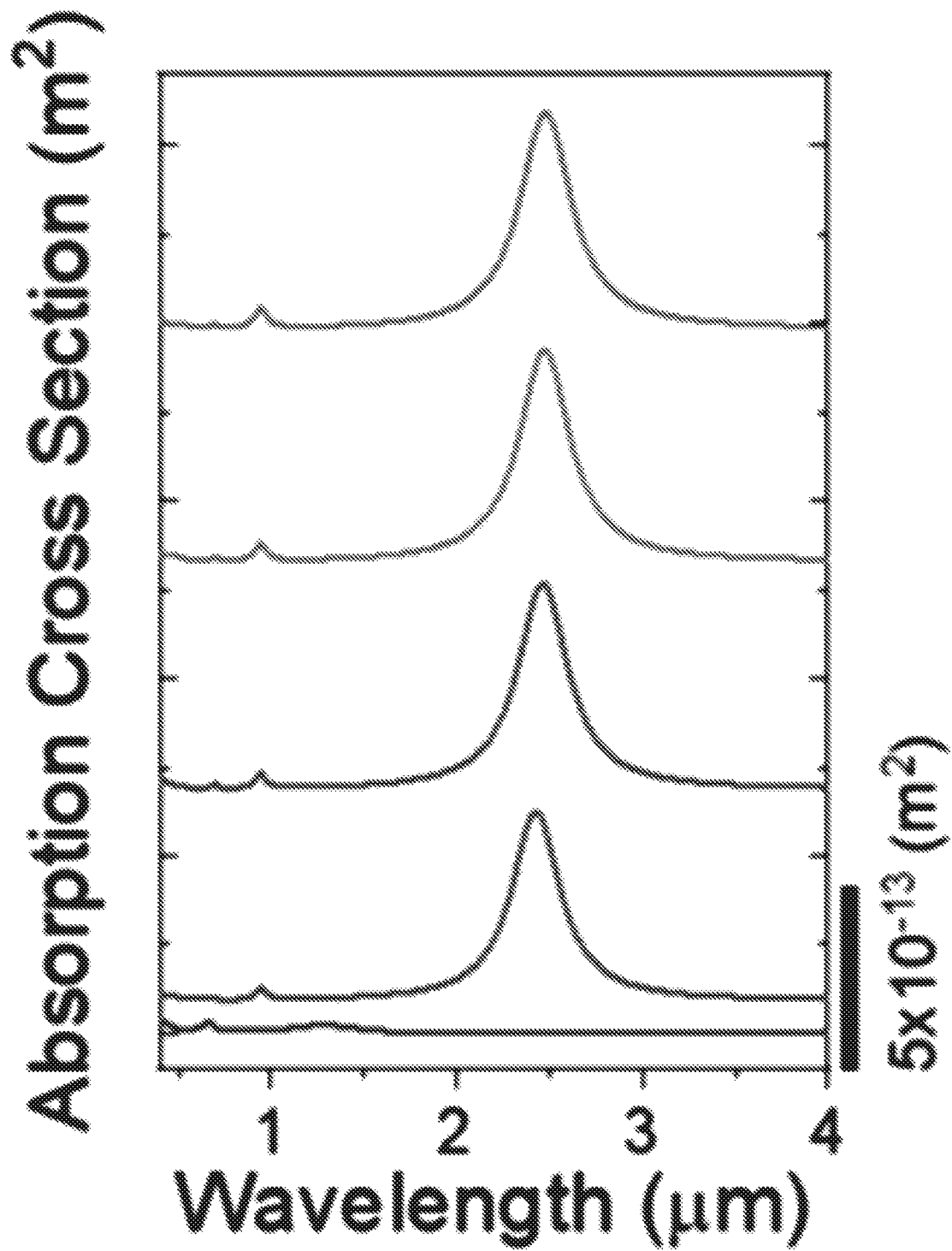
FIG. 13 shows the absorption cross section of a gold nanorod as the diameter of the water droplet decreases.

FIGS. 11-13 show the extinction, scattering, and absorption cross sections of a high aspect ratio gold nanorod (l=450 nm, d=20 nm) as the diameter of the water droplet decreases from D=1000 nm to D=l=450 nm. The most striking feature as the water droplet evaporates is the decrease in the visible wavelength scattering. The albedo, which is the ratio of the scattering cross section to the extinction cross section, is 0.066 for the l=60 nm nanorods and 0.366 for the l=450 nm nanorods.

Figure 7:
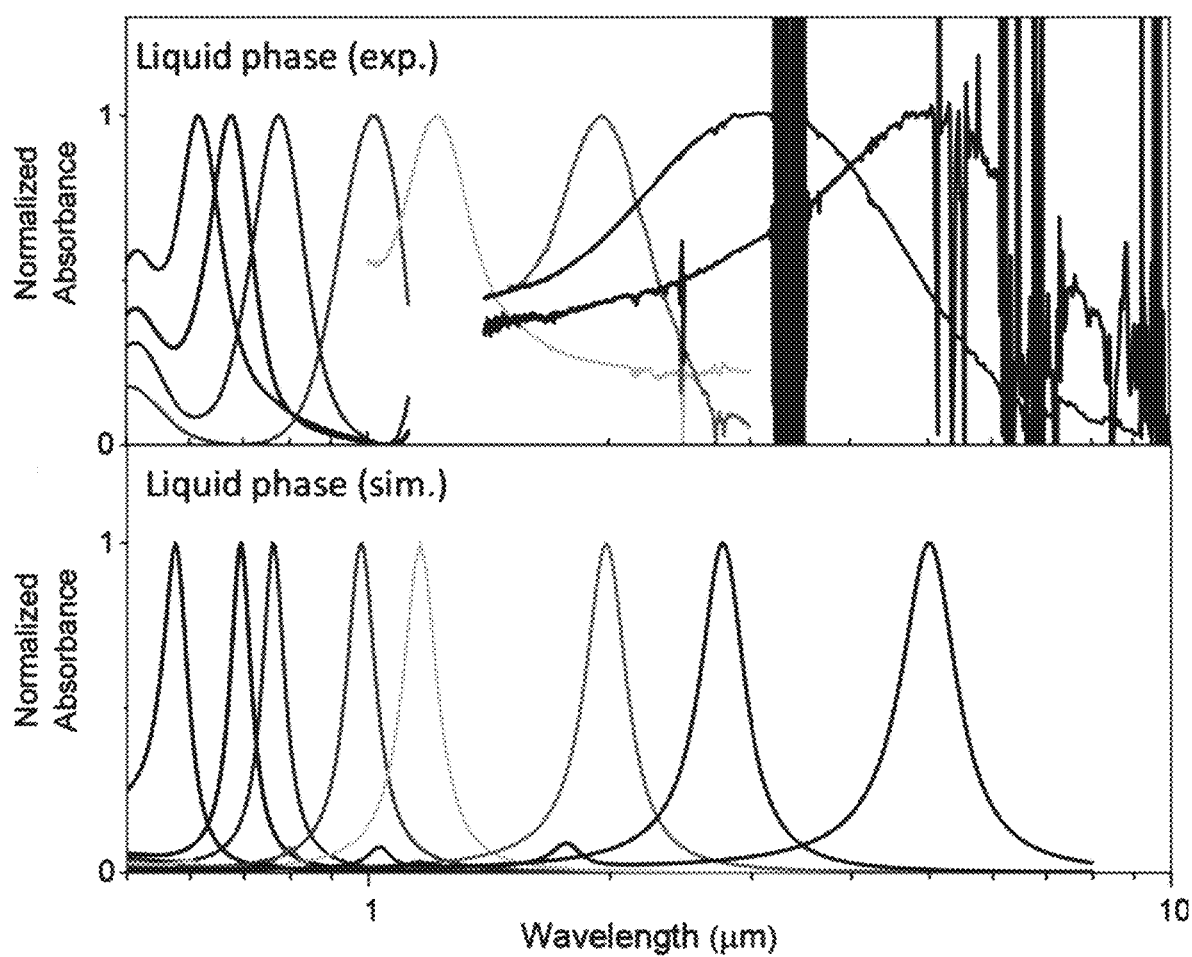
FIG. 7 shows experimental spectra (top) of gold nanorods with aspect ratios ranging from 1.5, 2.5, 3, 4.5 in water to 10, 15, 30 in toluene and three-dimensional finite-element simulation spectra (bottom) matching the experimental parameters and phases.
Figure 8:
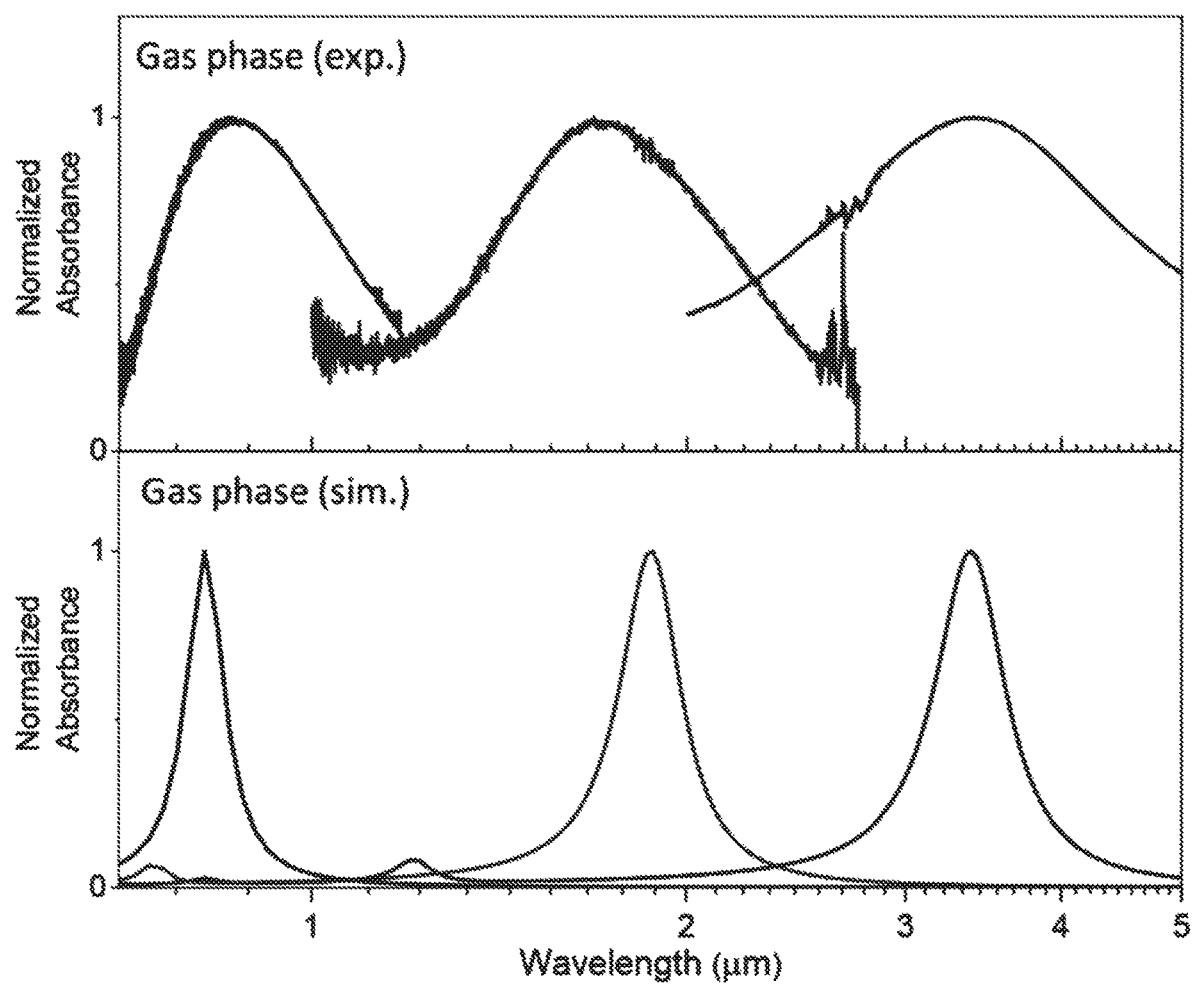
FIG. 8 shows experimental spectra (top) of gold nanorods with aspect ratios of 5, 15, 30 in air and three-dimensional finite-element simulation (bottom) matching the experimental parameters and phases.
Figure 9:
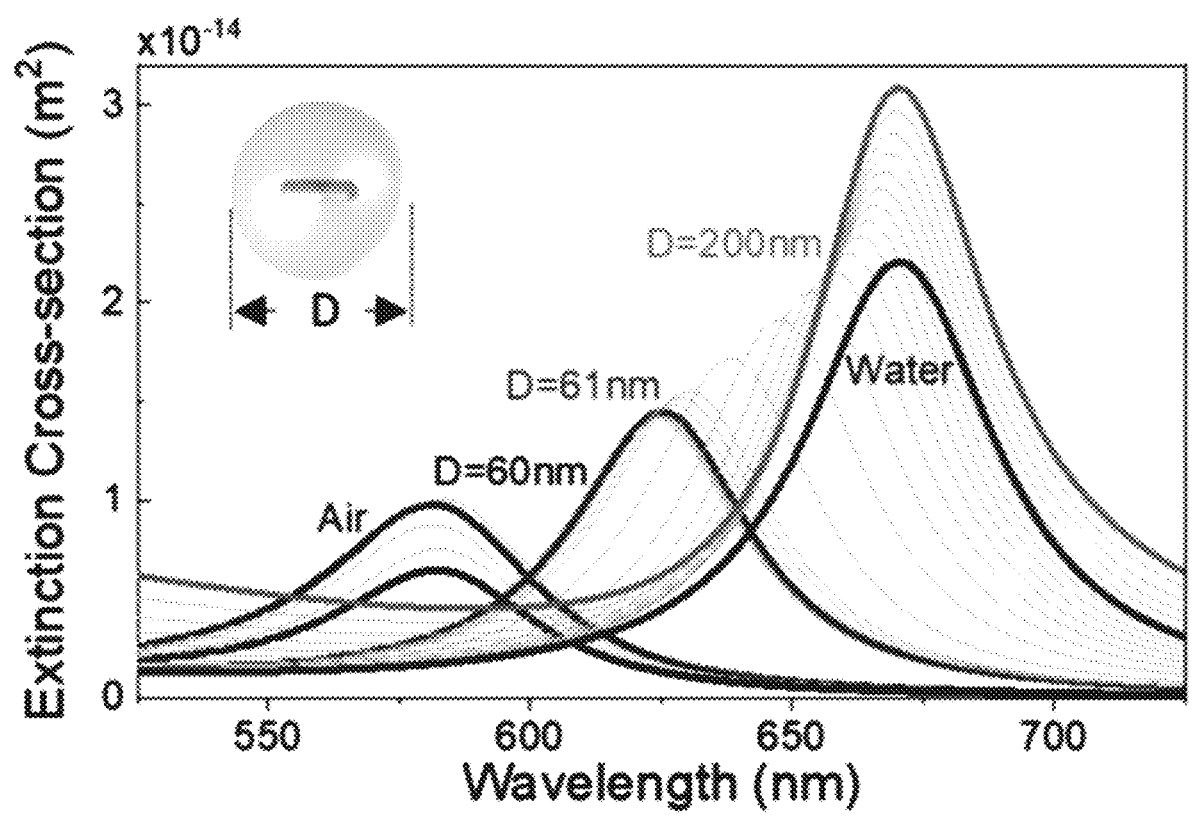
FIG. 9 shows extinction spectra of a nanorod surrounded by water and air, as the diameter of a water droplet D encasing the nanorod decreases.

Transitioning the nanorods from the liquid to the gas state results in large shifts in the absorbance peak wavelength, as shown in FIGS. 7-8. By monitoring the peak shifts and comparing the measurements with simulations, we can accurately determine the local refractive index of the medium surrounding the nanorods and therefore infer the state of the nanorod suspension, e.g., water, toluene, or air. Moreover, the effective $Q$ factor is a good metric to ensure the nanorods are not aggregated, as discussed with FIGS. 7-8.

Figure 14:
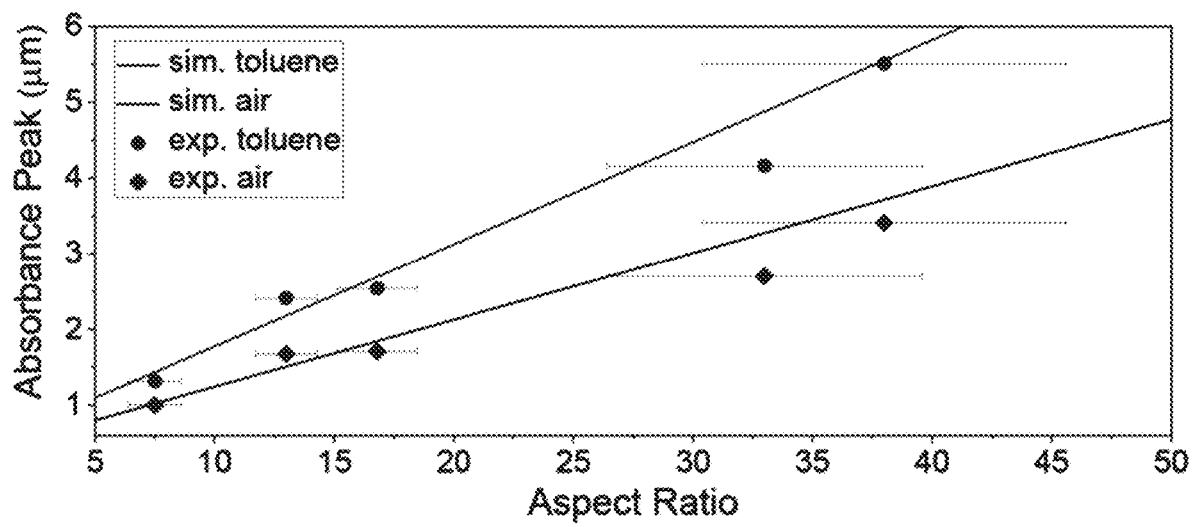
FIG. 14 shows the evolution of the absorbance peak wavelength as the nanorod aspect ratio and host refractive indexes are varied.

To validate that the nanorods are dispersed in air, experiments and simulations were carried out measuring the absorbance peak wavelength at various aspect ratios of the gold nanorods: 7.5, 13, 16.8, 33, and 38 in toluene and air (FIG. 14).

The simulations show that the absorbance peak wavelength depends linearly on the aspect ratio of the nanorods, $\lambda_{toluene}$=0.135(l/d)+0.422 and $\lambda_{air}$=0.0883 (l/d)+0.359, and the peak redshifts as the refractive index of the host medium increases.[28]

The experimental data were found to agree well with the simulation data, within experimental uncertainty, and that the absorbance peak is proportional to the aspect ratio. Furthermore, the experimental data for the nanorods in air agree well with the simulation predictions for their peak wavelengths, implying the nanorods are homogeneously dispersed as an aerosol.

To further confirm that the nanorods are uniformly suspended in air, the longitudinal absorption peak wavelength can be related to the refractive index of the host medium $n_m$[29] by $$\lambda = \lambda_p \sqrt{1 + (1 - L_\parallel)(n_s^2 - n_m^2)f + \left(\frac{1}{L_\parallel} - 1\right)n_m^2}, \quad (1)$$

where $\lambda_p$ is the plasma wavelength of gold, $n_s$ is the refractive index of the ligand shell coating the nanorods, and f is the ellipsoidal volume fraction of the inner nanorod to the outer ligand shell. The depolarization factor of the long axis of the nanorod is $$L_\parallel = [(1-\epsilon^2)/\epsilon]\{[(\tfrac{1}{2}\epsilon)[\ln(1-\epsilon)/(1+\epsilon)]-1]\}$$

where $\epsilon = \sqrt{1-(l/d)^2}$.

If the nanorods are very long ($1/L_\parallel \gg 1$) and there is no ligand shell ($n_s=n_m$), then Eq. (1) can be differentiated with respect to $n_m$ and then series expanded about $L_\parallel$ to approximate the sensitivity, $$\frac{\partial \lambda}{\partial n_m} \approx \frac{\lambda_p}{\sqrt{L_\parallel}}. \quad (2)$$

This result implies that if the geometric ($L_\parallel$) and material ($\lambda_p$) properties of the nanorod are known, the shift in the absorption peak wavelength can be estimated as the host medium surrounding the nanorods is varied.

In FIG. 14, it is shown that the sensitivity also depends linearly on the aspect ratio, $\partial\lambda/\partial n_m$=0.098 (l/d)+0.133, for the data retrieved from the simulations (solid line). This result is in good agreement with the experimental data. For smaller aspect ratios, the relationship in Eq. (2) is confirmed (dashed line). For larger aspect ratios, the predictions of Eq. (2) begin to deviate from the simulation data (e.g., 18% at aspect ratio=45), showing the limitations of the simple relationship. Eq. (2) provides a straightforward means to predict the sensitivity, and the good agreement with experimental and simulation data further supports the nanorods being thermodynamically stabilized in the gas phase.

Figure 15:
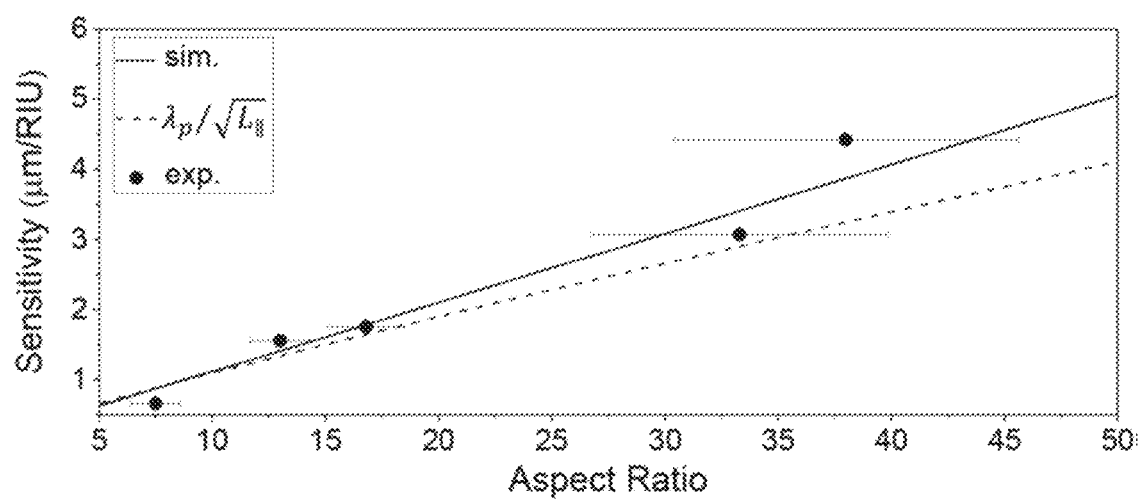
FIG. 15 shows the evolution of the sensitivity as the nanorod aspect ratio and host refractive indexes are varied.
Figure 16:
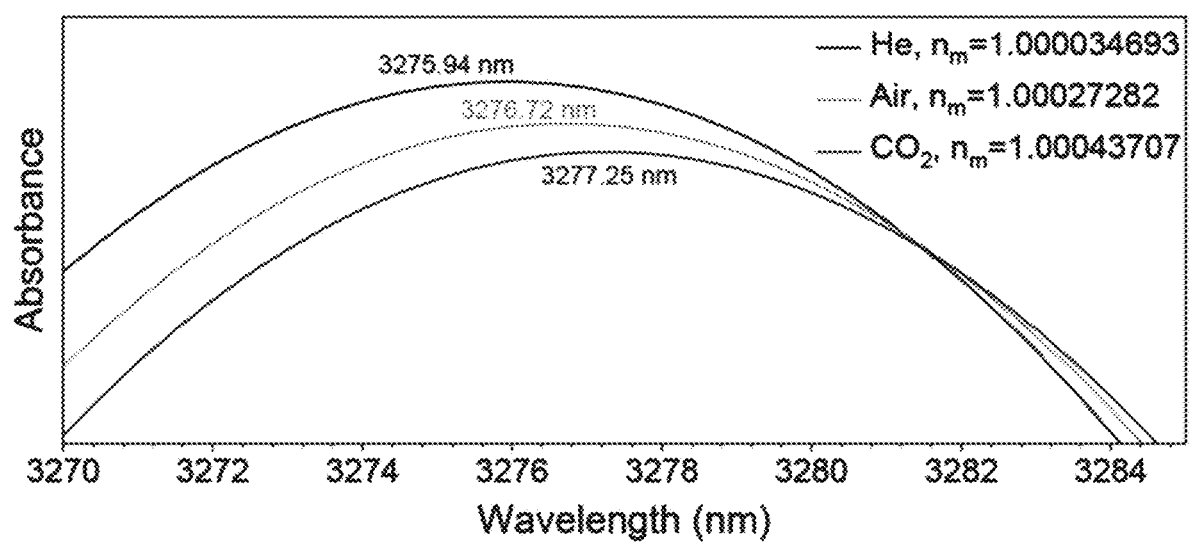
FIG. 16 shows the simulated absorbance spectra for plasmonic aerosols as a function of the host gas.

The absorbance peak wavelength shifts are on the order of several microns per refractive index unit (RIU) in FIG. 15. This large sensitivity implies that very small changes in the host medium can be detected, suggesting that plasmonic aerosols may be good candidates to accurately probe and model remote environments such as atmospheric systems at benchtop size scales. To investigate this possibility, gold nanorods with an aspect ratio of 30 were simulated in He, air, and $CO_2$ gaseous environments (FIG. 16). The absorbance peak wavelength shifted from 3275.94 nm for He to 3277.25 nm for $CO_2$, showing that changes of $\Delta nm \approx 10^{-4}$ may be detectable at atmospheric transmission window wavelengths.[30,31]

In summary, the aerosolization of gold nanorods from concentrated liquid suspensions, while simultaneously measuring their optical spectra at benchtop scales was demonstrated. The plasmonic aerosol absorption peaks are sharp and well defined with effective quality factors as large as 2.4. It was shown that by controlling the aspect ratio of the nanorods, the aerosol absorption peaks are broadly tunable over 2500 nm from visible to midwave infrared wavelengths. It was found that the sensitivity of the longitudinal absorption peak wavelength to the refractive index of the host medium depends linearly on the nanorod aspect ratio and can be estimated from the geometric and material properties of the nanorod. Utilizing this sensitivity dependence, it was also shown that minute changes of the host refractive index of $10^{-4}$ may be detectable, suggesting these materials could be useful for environmental or remote sensing.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

REFERENCES

[1] IPCC 2013, Climate Change 2013: *The Physical Science Basis. Contribution of Working Group I to the Fifth*

*Assessment Report of the Intergovernmental Panel on Climate Change*, edited by T. F. Stocker et al. (Cambridge University Press, Cambridge UK, 2013).

[2] J. Fan, D. Rosenfeld, Y. Zhang, S. E. Giangrande, Z. Li, L. A. T. Machado, S. T. Martin, Y. Yang, J. Wang, P. Artaxo, H. M. J. Barbosa, R. C. Braga, J. M. Comstock, Z. Feng, W. Gao, H. B. Gomes, F. Mei, C. Pohlker, M. L. Pohlker, U. Poschl, and R. A. F. de Souza, Science 359, 411 (2018).

[3] J. A. Thornton, K. S. Virts, R. H. Holzworth, and T. P. Mitchell, Geophys. Res. Lett. 44, 9102 (2017).

[4] D. W. Keith, Annu. Rev. Energy Environ. 25, 245 (2000).

[5] D. W. Keith, Proc. Natl. Acad. Sci. USA 107, 16428 (2010).

[6] A. J. Palmer, Opt. Lett. 5, 54 (1980).

[7] A. J. Palmer, J. Opt. Soc. Am. 73, 1568 (1983).

[8] K. M. Leung, Opt. Lett. 10, 347 (1985).

[9] L. V. Besteiro, K. Gungor, H. V. Demir, and A. O. Govorov, J. Phys. Chem. C 121, 2987 (2017).

[10] L. V. Besteiro, X.-T. Kong, Z. Wang, F. Rosei, and A. O. Govorov, Nano Lett. 18, 3147 (2018).

[11] C. F. Bohren and D. R. Huffman, *Absorption and Scattering of Light by Small Particles* (Wiley-VCH, New York, 1983).

[12] V. B. Koman, P. Liu, D. Kozawa, A. T. Liu, A. L. Cottrill, Y. Son, J. A. Lebron, and M. S. Strano, Nat. Nanotechnol. 13, 819 (2018).

[13] O. D. Miller, C. W. Hsu, M. T. H. Reid, W. Qiu, B. G. DeLacy, J. D. Joannopoulos, M. Soljacic, and S. G. Johnson, Phys. Rev. Lett. 112, 123903 (2014).

[14] O. D. Miller, A. G. Polimeridis, M. T. Homer Reid, C. W. Hsu, B. G. DeLacy, J. D. Joannopoulos, M. Soljacic, and S. G. Johnson, Opt. Express 24, 3329 (2016).

[15] V. G. Kravets, F. Schedin, and A. N. Grigorenko, Phys. Rev. B 78, 205405 (2008).

[16] K. Park, M.-s. Hsiao, Y.-J. Yi, S. Izor, H. Koerner, A. Jawaid, and R. A. Vaia, ACS Appl. Mater. Interfaces 9, 26363 (2017).

[17] B. R. Stoner and J. T. Glass, Nat. Nanotechnol. 7, 485 (2012).

[18] S. Srisonphan, Y. S. Jung, and H. K. Kim, Nat. Nanotechnol. 7, 504 (2012).

[19] W. M. Jones, D. Lukin, and A. Scherer, Appl. Phys. Lett. 110, 263101 (2017).

[20] J. Fontana, G. K. B. da Costa, J. M. Pereira, J. Naciri, B. R. Ratna, P. Palffy-Muhoray, and I. C. S. Carvalho, Appl. Phys. Lett. 108, 081904 (2016).

[21] S. Etcheverry, L. F. Araujo, G. K. B. da Costa, J. M. B. Pereira, A. R. Camara, J. Naciri, B. R. Ratna, I. Hernandez-Romano, C. J. S. de Matos, I. C. S. Carvalho, W. Margulis, and J. Fontana, Optica 4, 864 (2017).

[22] A. A. Gupta, S. Arunachalam, S. G. Cloutier, and R. Izquierdo, ACS Photonics 5, 3923 (2018).

[23] G. C. Phan-Quang, H. K. Lee, H. W. Teng, C. S. L. Koh, B. Q. Yim, E. K. M. Tan, W. L. Tok, I. Y. Phang, and X. Y. Ling, Angew. Chem., Int. Ed. Engl. 57, 5792 (2018).

[24] R. Raliya, D. Saha, T. S. Chadha, B. Raman, and P. Biswas, Sci. Rep. 7, 44718 (2017).

[25] Y. Takenaka and H. Kitahata, Chem. Phys. Lett. 467, 327 (2009).

[26] B. P. Khanal and E. R. Zubarev, J. Am. Chem. Soc. 130, 12634 (2008).

[27] S. Eustis and M. A. El-Sayed, J. Appl. Phys. 100, 044324 (2006).

[28] J. Fontana, R. Nita, N. Charipar, J. Naciri, K. Park, A. Dunkelberger, J. Owrutsky, A. Pique, R. Vaia, and B. Ratna, Adv. Opt. Mater. 5, 1700335 (2017).

[29] J. Yang, J. C. Wu, Y. C. Wu, J. K. Wang, and C. C. Chen, Chem. Phys. Lett. 416, 215 (2005).

[30] F. Neubrech, A. Pucci, T. W. Cornelius, S. Karim, A. Garcia-Etxarri, and J. Aizpurua, Phys. Rev. Lett. 101, 157403 (2008).

[31] A. Raman and S. Fan, Phys. Rev. B 83, 205131 (2011).

[32] A. D. Rakić, A. B. Djurišić, J. M. Elazar, and M. L. Majewski, Appl. Opt. 37, 5271 (1998).

What is claimed is:

1. An apparatus comprising:
 a vessel for containing a suspension comprising a liquid and solid particles suspended therein;
 a tube having a narrowed portion;
  wherein the tube is configured to draw the suspension from the vessel into the tube when a gas flows through the tube;
 an aerosol generator coupled to the tube for forming an aerosol from the suspension;
 a dehydrator coupled to the aerosol generator for removing the liquid from the aerosol forming a dried aerosol;
 a multiple-pass spectroscopic absorption cell coupled to the dehydrator to pass the dried aerosol into the absorption cell; and
 a Fourier transform spectrometer coupled to the absorption cell to measure an absorption spectrum of the dried aerosol.

2. The apparatus of claim 1, wherein the aerosol generator is capable of forming aerosol droplets less than 1 micron in diameter.

3. The apparatus of claim 1, wherein the dehydrator comprises a desiccant that causes diffusion dehydration of the aerosol.

4. The apparatus of claim 1, wherein the absorption cell is a Herriott cell having an optical path length of up to 20 m.

5. The apparatus of claim 1, further comprising:
 a vacuum pump coupled to the adsorption cell to draw the gas, the suspension, the aerosol, and the dried aerosol through the apparatus.

6. A method comprising:
 providing the apparatus of claim 1;
 placing the suspension into the vessel;
 flowing the gas through the tube; and
 measuring an absorption spectrum of the dried aerosol.

7. The method of claim 6, wherein the suspension is an aqueous suspension.

8. The method of claim 6, wherein the solid particles are gold nanorods.

9. The method of claim 6, wherein the gas is dry air.

* * * * *

UNITED STATES PATENT AND TRADEMARK OFFICE
CERTIFICATE OF CORRECTION

PATENT NO. : 11,406,997 B2  
APPLICATION NO. : 16/784534  
DATED : August 9, 2022  
INVENTOR(S) : Jake Fontana and Jawad Naciri Page 1 of 1

It is certified that error appears in the above-identified patent and that said Letters Patent is hereby corrected as shown below:

On the Title Page

Item (60) should be:
Provisional application No. 62/918,713, filed on February 15, 2019.

Signed and Sealed this
Eleventh Day of October, 2022

Katherine Kelly Vidal
*Director of the United States Patent and Trademark Office*